United States Patent
Chiu

[19]

[11] Patent Number: 6,065,850
[45] Date of Patent: May 23, 2000

[54] BUBBLING WATER LAMP DEVICE

[76] Inventor: Paul Pao-Tien Chiu, 2F., No. 8, Lane 65, Sec. 2, Chung-Shan N. Rd., Taipei, Taiwan

[21] Appl. No.: 09/222,949

[22] Filed: Dec. 30, 1998

[51] Int. Cl.[7] .................................................... F21V 33/00
[52] U.S. Cl. ............................ 362/101; 362/96; 362/806
[58] Field of Search ............................ 362/96, 101, 253, 362/318, 806, 293; 119/266, 267

[56] References Cited

U.S. PATENT DOCUMENTS

| | | | |
|---|---|---|---|
| 378,126 | 2/1888 | Wright | 119/267 |
| 4,703,720 | 11/1987 | Shipman et al. | 119/267 |
| 4,974,127 | 11/1990 | Foley | 362/96 |

*Primary Examiner*—Y. Quach
*Attorney, Agent, or Firm*—Bacon & Thomas, PLLC

[57] ABSTRACT

A bubbling water lamp device, comprising an extractable display tank filled with liquid, a base joining the bottom end of the display tank, a projecting lamp, and an air supplier. A plurality of air apertures disposed at the bottom of the display tank connects to a stop valve. A revolvable multi-color disk is arranged on the base under the bottom edge of the transparent display tank. The air supplier pumps air into the display tank to create numerous bubbles moving upwards continuously, and the projecting lamp emits light at the display tank via the multicolor disk to make the bubbling water lamp device rich in dynamic feeling and be a decorative item, and the display tank can be extracted directly for cleaning.

7 Claims, 6 Drawing Sheets

BUBBLING WATER LAMP DEVICE

BACKGROUND OF THE INVENTION

This invention relates to an improved structure for a bubbling water lamp device, and particularly to a bubbling water lamp device that can offer a directly extractable transparent display tank, which can prevent water from flowing back into the air supplier, and provide a diversified and colorful scene for appreciation.

When it is unnecessary to worry about his next meal, one becomes more interested in something that can amplify or beautify his living content, such as art or music appreciation. Some other people like to buy paintings or antiques for home decoration. However most articles are of a static nature, and it is not easy to find something dynamic, splendid, and colorful as what this invention intends to provide-an improved bubbling water lamp device.

Some manufactures have developed a bubbling water lamp device as a dynamic decorative means, wherein a display tank filled with water is fixed on a base; an electric power driven air supplier and a hand-operated air supplier are provided outside the display tank; the air supplier pumps air to form numerous bubbles in the liquid, which is lightened by a projecting lamp through an extractable color disk to offer dynamic, changeable scenes. In the case a user wants to change color presented in the display tank, he has to extract and replace the color disk. When cleaning of the display tank is desired, as the display tank is joined to the base to form an integral body, the user has to carry or decline the whole body to pour the water out. In addition, in order to assure water will not filtrate into the electric components, those components are put outside the display tank and that results in a relatively larger volume.

For purpose of decreasing the space occupied, a late design has the electric components being moved inside the base and also has the display tank and the base been assembled in a knockdown manner. Nevertheless, a user has to carry or decline the whole body to remove water for cleaning, and in case the cleaning is not made thoroughly, some remaining water may flow back to the air supplier or other components to cause impairment; or, it may flow back during a temporary power failure.

SUMMARY OF THE INVENTION

This invention is proposed to eliminate the above defects by providing an improved structure that offers a directly extractable transparent display tank without pouring out water firstly.

Another object of this invention is to provide a stop valve that can prevent water from flowing back to the air supplier.

A further object of this invention is to provide an easy way for changing the color of the projecting lamp to present diversified efficacy.

This invention relates to an improved structure for a bubbling water lamp device, comprising: an extractable display tank filled with water, wherein plural air apertures disposed at the bottom edge of the display tank connect with a stop valve; a base joining a pair of joint legs of the display tank, wherein a revolvable multicolor disk is arranged on the base underneath the display tank; a projecting lamp; and an air supplier. The air supplier pumps air into the display tank to form bubbles moving upwards continuously, and the projecting lamp radiates light to the display tank via the color disk to present dynamic atmosphere.

BRIEF DESCRIPTION OF THE DRAWINGS

For a better understanding to the present invention, together with further advantages or features thereof, at least one preferred embodiment will be described in detail below with reference to the annexed drawings in which.

DETAILED DESCRIPTION OF THE PREFERRED EMBODIMENT

Figure 1:
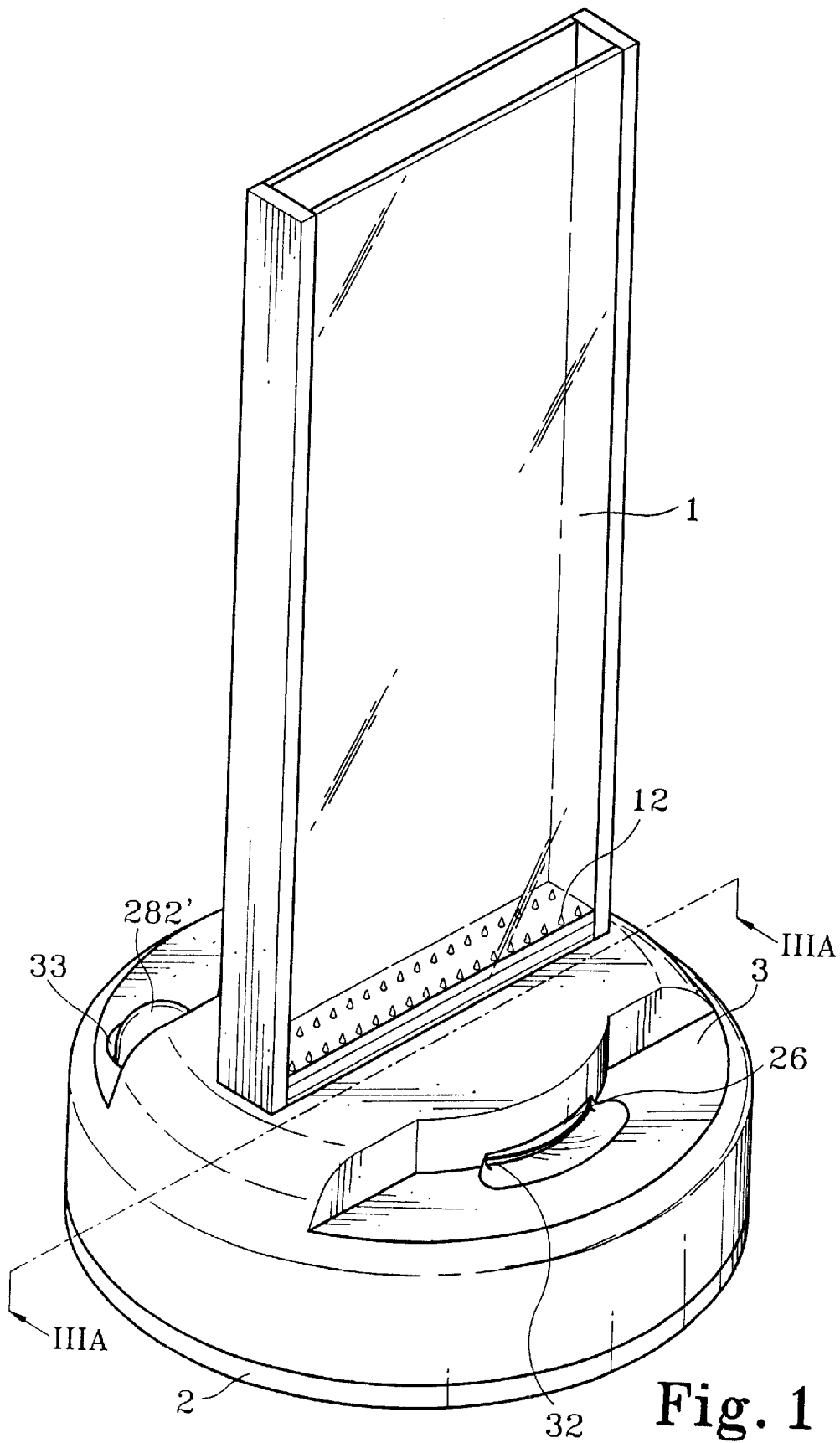
FIG. 1 is a three-dimensional elevation view of this invention.
Figure 2:
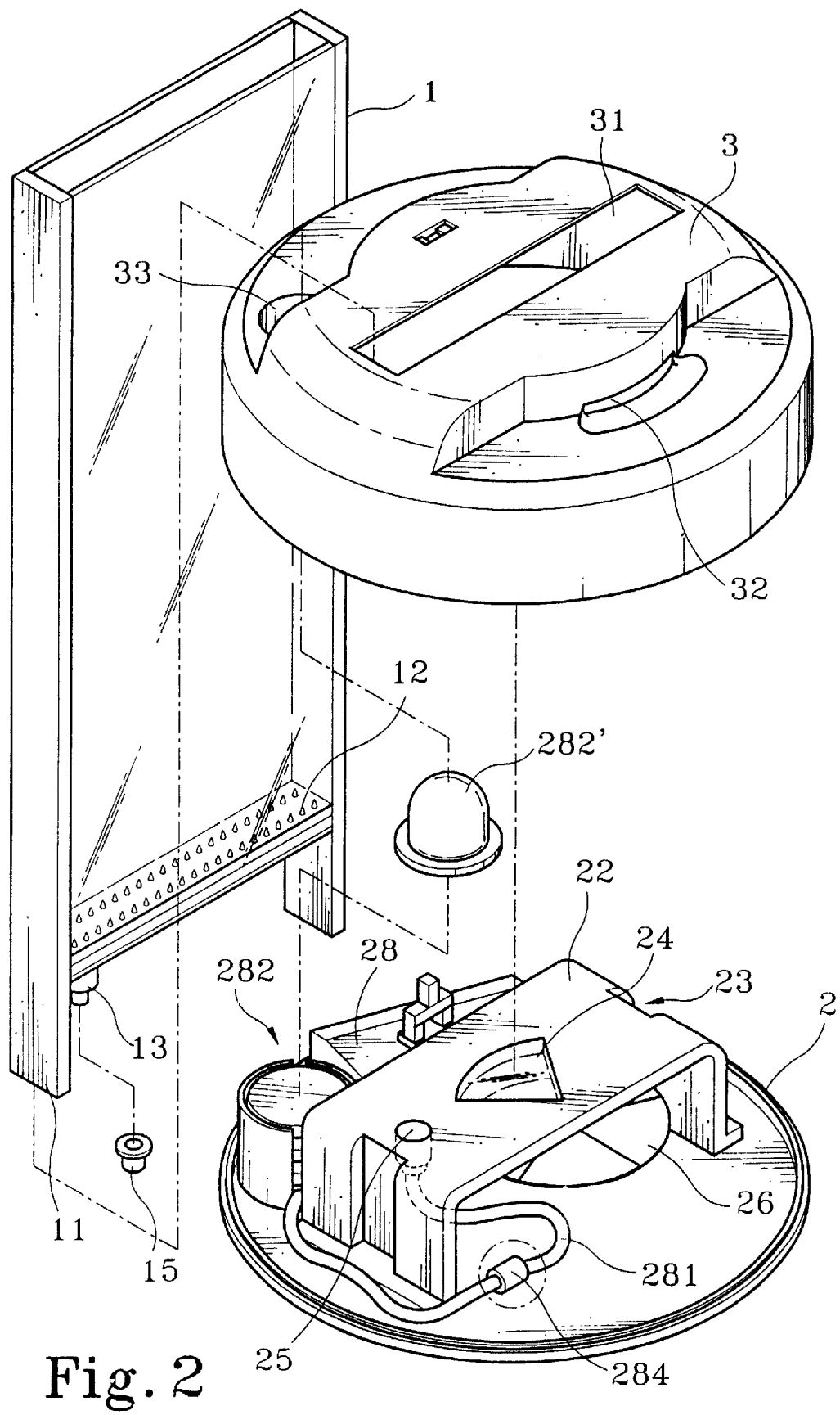
FIG. 2 is a three-dimensional exploded view of this invention.
Figure 4:
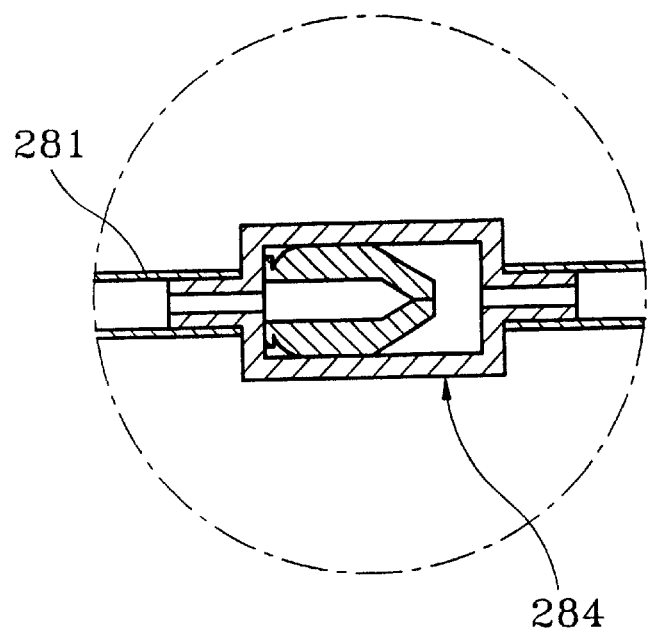
FIG. 4 is a partial enlarged lateral view of FIG. 2.

As shown in FIG. 1 and FIG. 2 of an improved structure of bubbling water lamp device comprises a display tank 1, a base 2, and a housing unit 3. The display tank 1 consists of plural plate bodies, wherein two of the plate bodies are transparent; the bottom end of the display tank 1 is extended to form a pair of joint legs 11; the bottom edge of the display tank 1 is provided with plural conic air apertures 12 that connect to a stop valve 13; and the stop valve 13 is collared with a rubber washer 15 to enable the stop valve 13 to contact closely with an insertion orifice 25. A support frame 22 is constructed on the base 2, wherein a reception recess 23 is formed on each of two lateral faces of the support frame 22, which is provided with a transparent sectoral window 24 at a central portion of its top face. The insertion orifice 25 locates at one end near the window 24 for the stop valve 13 and the rubber washer 15 to plug in. A projecting lamp 27 is disposed under a revolvable multicolored disk 26, which is placed underneath the window 24. An air supplier 28 arranged on the base 2 is provided with an air duct 281, which is connected with a hand-operated air supplier 282 for increasing air supply. A pressing cap 282' is provided to the hand-operated air supplier 282, which is connected to the insertion orifice 25 in the support frame 22 by the air duct 281 via a stop valve 284 (As shown in FIG. 4). An insertion slot 31 is formed on the top face of the housing unit 3, which is fixed on the base 2, at a position corresponding to the reception recess 23. On a lateral side of the insertion slot 31, a gap 32 is preserved for allowing the disk 26 to extend out of the housing unit 3. A through hole 33 is formed in the housing unit 3 for the pressing cap 282' to extend over the top face of the housing unit 3.

Figure 3A:
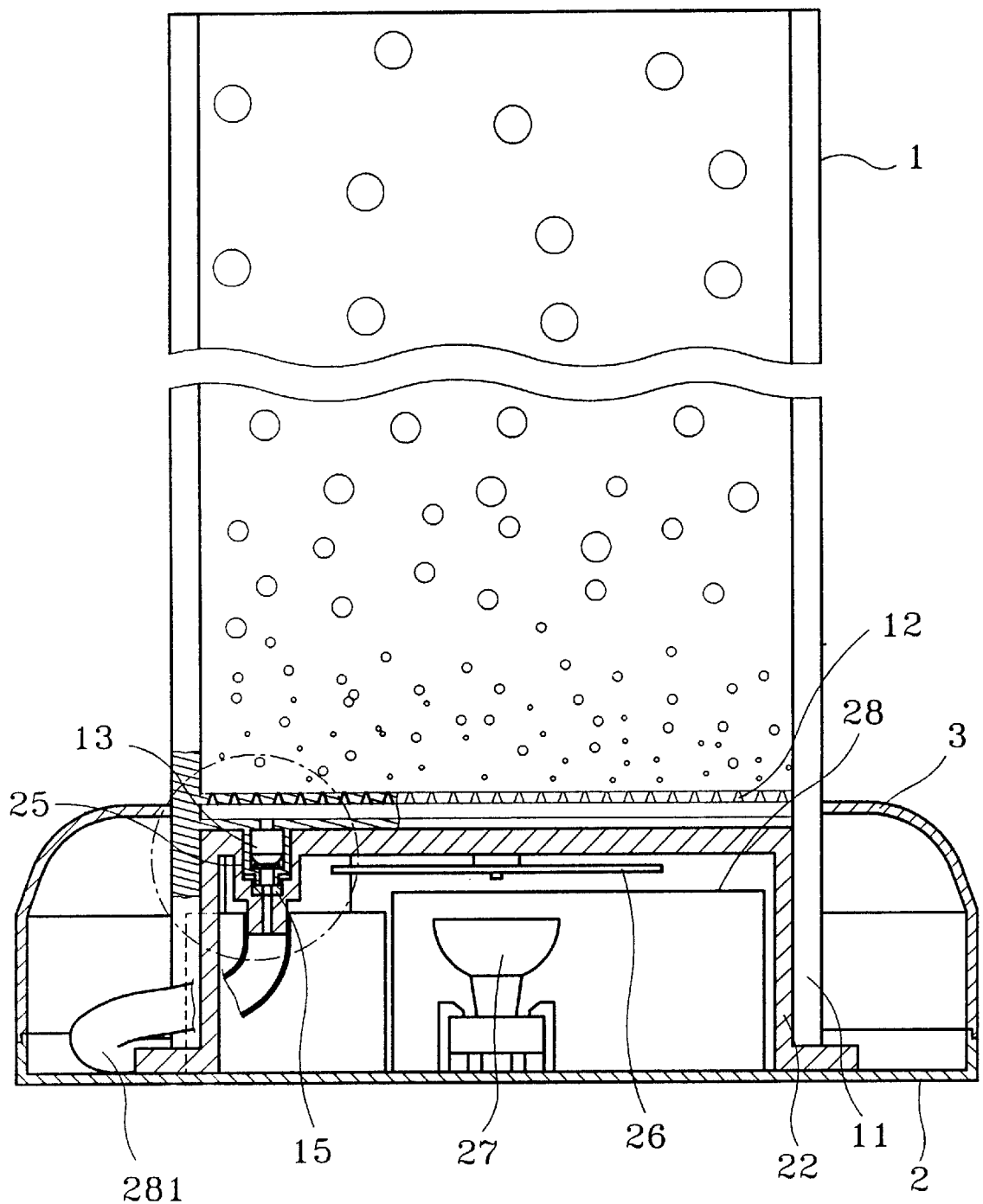
FIG. 3A is a cutaway sectional view of FIG. 1 along line III A—III A.
Figure 3B:
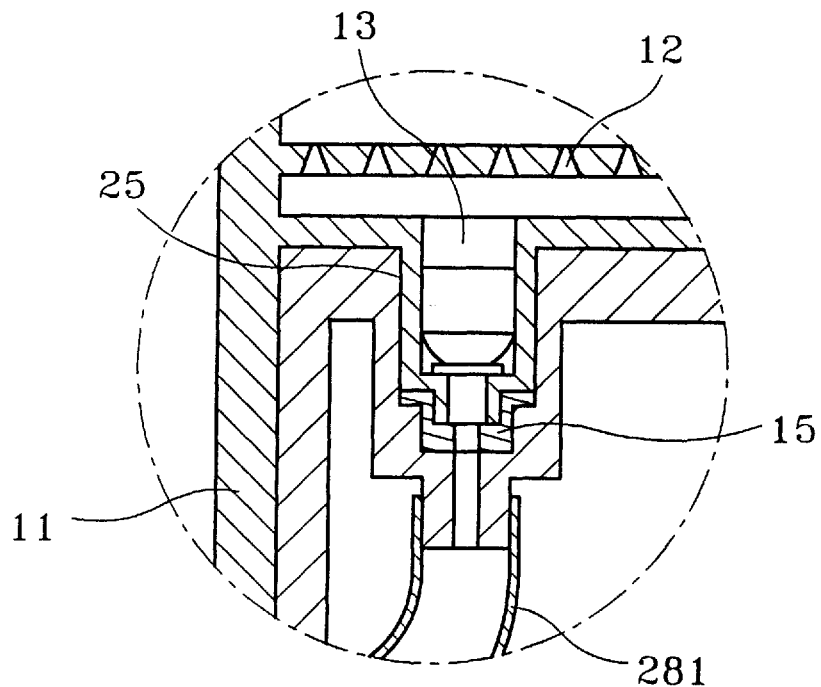
FIG. 3B is a partial enlarged diagram of FIG. 3A.

The pair of joint legs 11 of the display tank 1 is inserted in the reception recess 23 of the support frame 22 through the insertion slot 31 of the housing unit 3. The stop valve 13 and the rubber washer 15 collared thereon are inserted in the insertion orifice 25 of the support frame 22 (As shown in FIG. 3B). Air is provided by the air supplier 28 to flow through the air duct 281, the hand-operated air supplier 282, the air duct 281, the stop valve 284, all the way to the stop valve 13 of the display tank 1. The air passes through the stop valve 13, then the plural air apertures 12 create continuously numerous bubbles moving upwards (As shown in FIG. 3A). The light emitted from the lamp 27 passing through the revolvable multicolored disk 26 projects on the display tank 1 to present a dynamic, splendid, and colorful world.

Figure 3C:
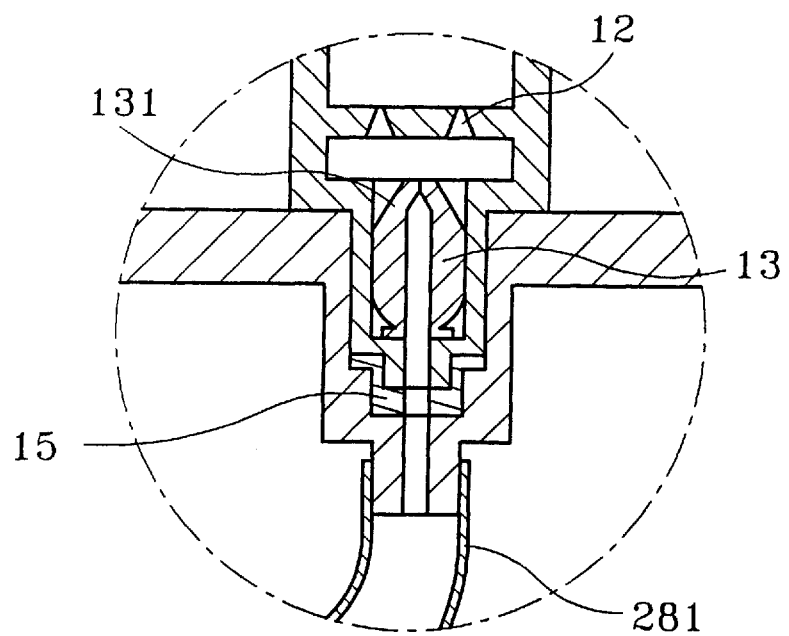
FIG. 3C is a cutaway lateral view of FIG. 3B.
Figure 3D:
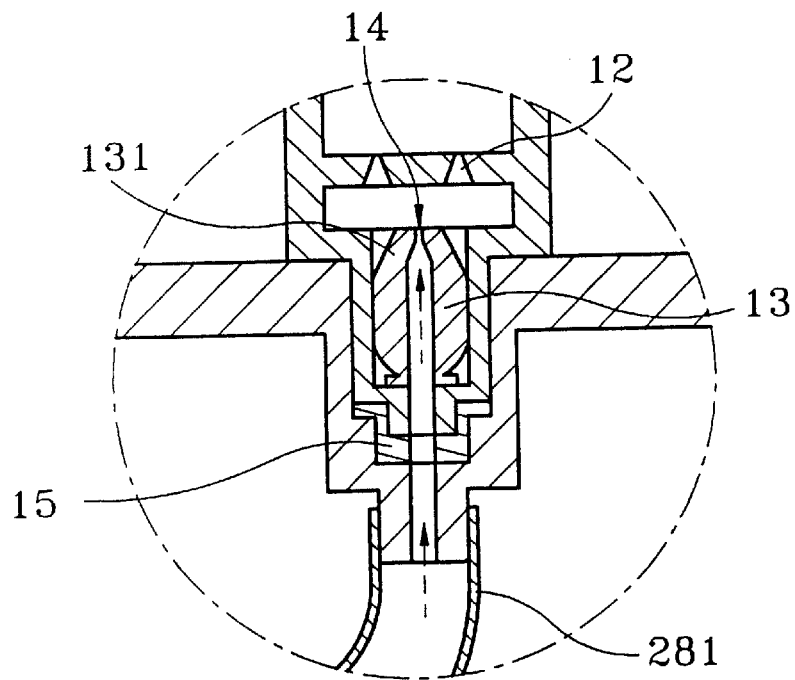
FIG. 3D is a schematic diagram showing action of FIG. 3C.

As shown in FIGS. 3C and 3D, the tube wall 131 of the stop valve 13 will press to close the air outlet 14 when no more air is passing through the channel. When air is replenished again, the tube wall 131 will be pushed outwards to open the narrow outlet 14 for air to pass due to air pressure. Therefore, when cleaning the display tank 1 is desired, all a user has to do is stop the air supply to close the outlet 14, so that he can extract the display tank 1 out of the base 2 without worrying about a back flow of water into the air supplier 28, and further, the conic air apertures 12 allow the remaining air to flow out and air pressure thereof forbids water to flow back into the stop valve 13. Besides, the additional stop valve 284 provides a dual assurance of preventing water from flowing back into the air supplier 28.

Moreover, by virtue of the hand-operated air supplier 282, the airflow can be enlarged to produce diversification, and meanwhile, to clear residue that may clog the air apertures 12.

Figure 5:
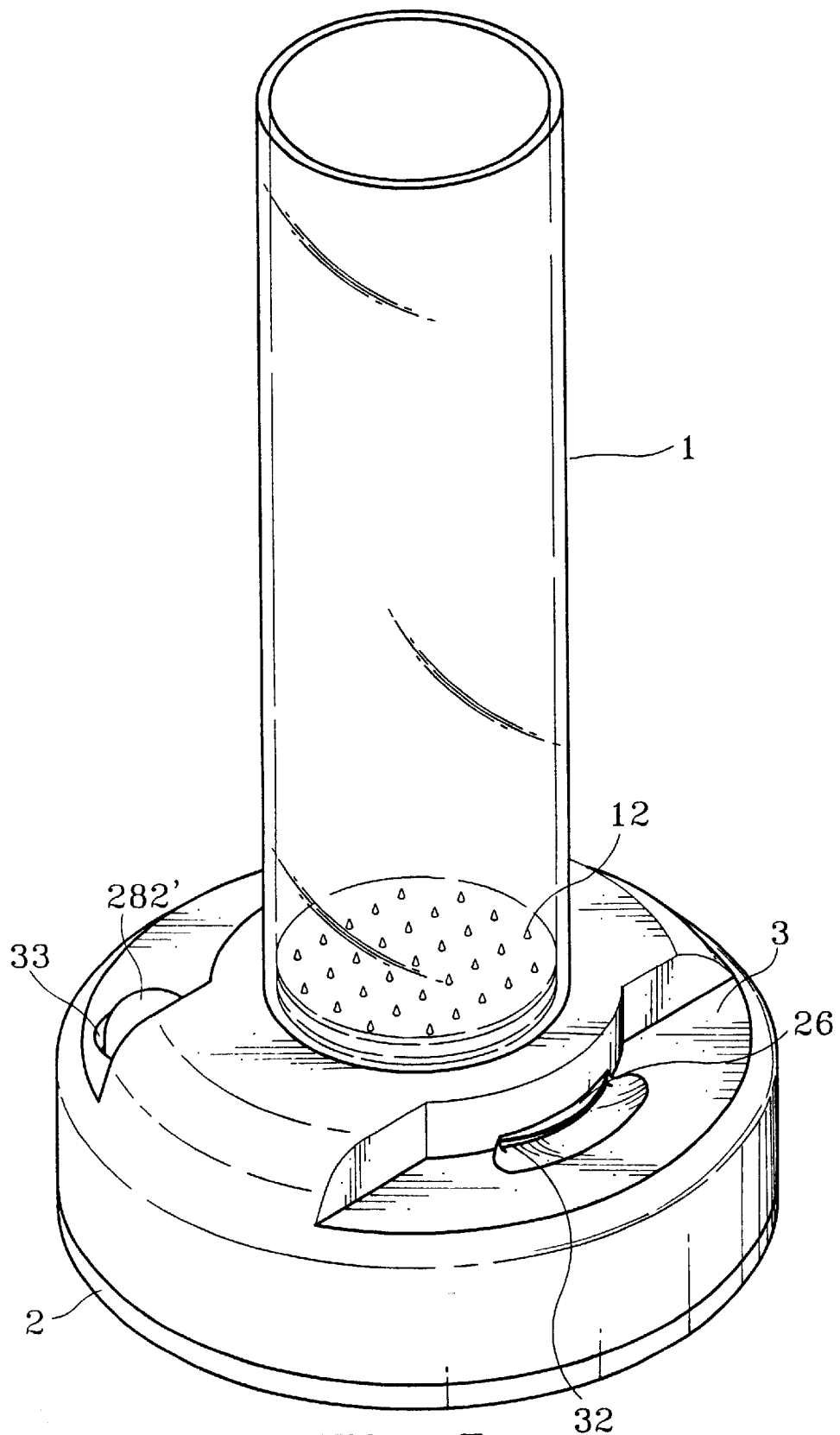
FIG. 5 is a schematic view showing another embodiment of this invention.

As shown in FIG. 5, the display tank 1 can be a hollow cylinder.

What is claimed is:

1. A bubbling water lamp device comprising a base having a support frame, a reception recess on each of two lateral faces of said support frame; a housing unit fixed on said base having an insertion slot disposed at a position corresponding to said reception recesses, an air supplier fixed on said base having an air duct connecting with an insertion orifice of said support frame, a display tank having a first stop valve and comprised of a plurality of connected plate bodies; said display tank filled with liquid, a bottom end of said display tank extended to form a pair of joint legs inserting in said reception recesses of said support frame through said insertion slot of said housing unit; a plurality of air apertures arranged in a bottom edge of said display tank; said air apertures connected with said first stop valve inserting in said insertion orifice; said air supplier pumping air into said first stop valve to create numerous bubbles moving upwards continuously in said display tank via said plurality of air apertures; and wherein said display tank is extractable directly from the housing unit for cleaning.

2. The bubbling water lamp device of claim 1, wherein a second stop valve is provided between said air duct and said first stop valve for preventing water from flowing back to said air supplier.

3. The bubbling water lamp device of claim 1, wherein said plate bodies are transparent.

4. The bubbling water lamp device of claim 1, wherein a transparent window is disposed on a top face of said support frame and disposed at a position corresponding to said insertion slot, and a projecting lamp positioned under said support frame radiating light at said display tank.

5. The bubbling water lamp device of claim 4, wherein a multicolor disk placed under the transparent window and on top of said lamp, a gap arranged in said housing unit, said multicolor disk in said base and extended outside of said housing unit through said gap, and wherein rotation of said multicolor disk, color of projected light at said display tank changed continuously.

6. The bubbling water lamp device of claim 5, wherein a motor connected to said multicolor disk for rotating the disk.

7. The bubbling water lamp device of claim 1, wherein a hand-operated air supplier is interpolated between said air duct and said stop valve; a through hole formed in a top face of said housing unit, and a pressing cap extended over the through hole.

\* \* \* \* \*